United States Patent [19]
Sutherlin

[11] Patent Number: 5,235,778
[45] Date of Patent: Aug. 17, 1993

[54] ANIMAL TRAP

[76] Inventor: David A. Sutherlin, 110 W. Nippino Trail, Nokomis, Fla. 34275

[21] Appl. No.: 970,257

[22] Filed: Nov. 2, 1992

[51] Int. Cl.$^5$ ............................................. A01M 23/02
[52] U.S. Cl. ................................................................ 43/61
[58] Field of Search ............................ 43/61, 60, 63, 120

[56] References Cited

U.S. PATENT DOCUMENTS

| | | | |
|---|---|---|---|
| 305,664 | 9/1884 | Bryan | 43/61 |
| 1,065,835 | 6/1913 | Power | 43/61 |
| 1,077,064 | 10/1913 | Hamann | 43/61 |
| 1,294,364 | 2/1919 | Bales | 43/61 |
| 1,327,229 | 1/1920 | Erickson | 43/61 |
| 1,913,823 | 6/1933 | Witte | 43/61 |
| 1,973,773 | 2/1931 | Brown | 43/61 |
| 2,167,291 | 7/1939 | Bowman | 43/61 |
| 2,275,043 | 3/1942 | Colwell | 43/61 |
| 2,488,202 | 11/1949 | Kern | 43/61 |
| 2,589,002 | 3/1952 | Vonada | 43/61 |
| 2,620,589 | 12/1952 | Jones | 43/61 |
| 2,692,453 | 10/1954 | Wingfield | 43/61 |
| 3,426,470 | 2/1969 | Rudolph | 43/61 |
| 4,707,943 | 11/1987 | Benigno | 43/61 |
| 4,899,484 | 2/1990 | Morin | 43/61 |

Primary Examiner—Kurt C. Rowan
Attorney, Agent, or Firm—Charles J. Prescott

[57] ABSTRACT

An animal trap and method of constructing same utilizing a conventional trash container having a bottom, side wall and an open end and removable lid therefor. The device includes a first and second annular band or ring each clampably connectable around the lid and container adjacent its opening, respectively, as well as a triggering rod and trip rod arrangement operably joined at a bell crank arrangement. A ground support arrangement connected to the second band supports the container in a generally horizontal position so that a hinge connected between first and second bands pivotally connects container opening and lid, the hinge being positioned directly above the ground support and at a highest common point of the bands. The triggering rod extends generally outside and along the length of the container, being held for axial movement only between the bell crank positioned near the bottom and an apertured bracket connected to a mid point of the lid. The lid is held in an open position by the triggering rod until urged axially by an animal within the container pulling on a bait container hung from the upright trip rod which extends downwardly from the bell crank through a hole formed in the side wall into the container. A separate floor trigger panel operably connected to the trip rod may also be provided which releases the lid to fall to its closed position as an animal enters the container and steps on the panel.

11 Claims, 3 Drawing Sheets

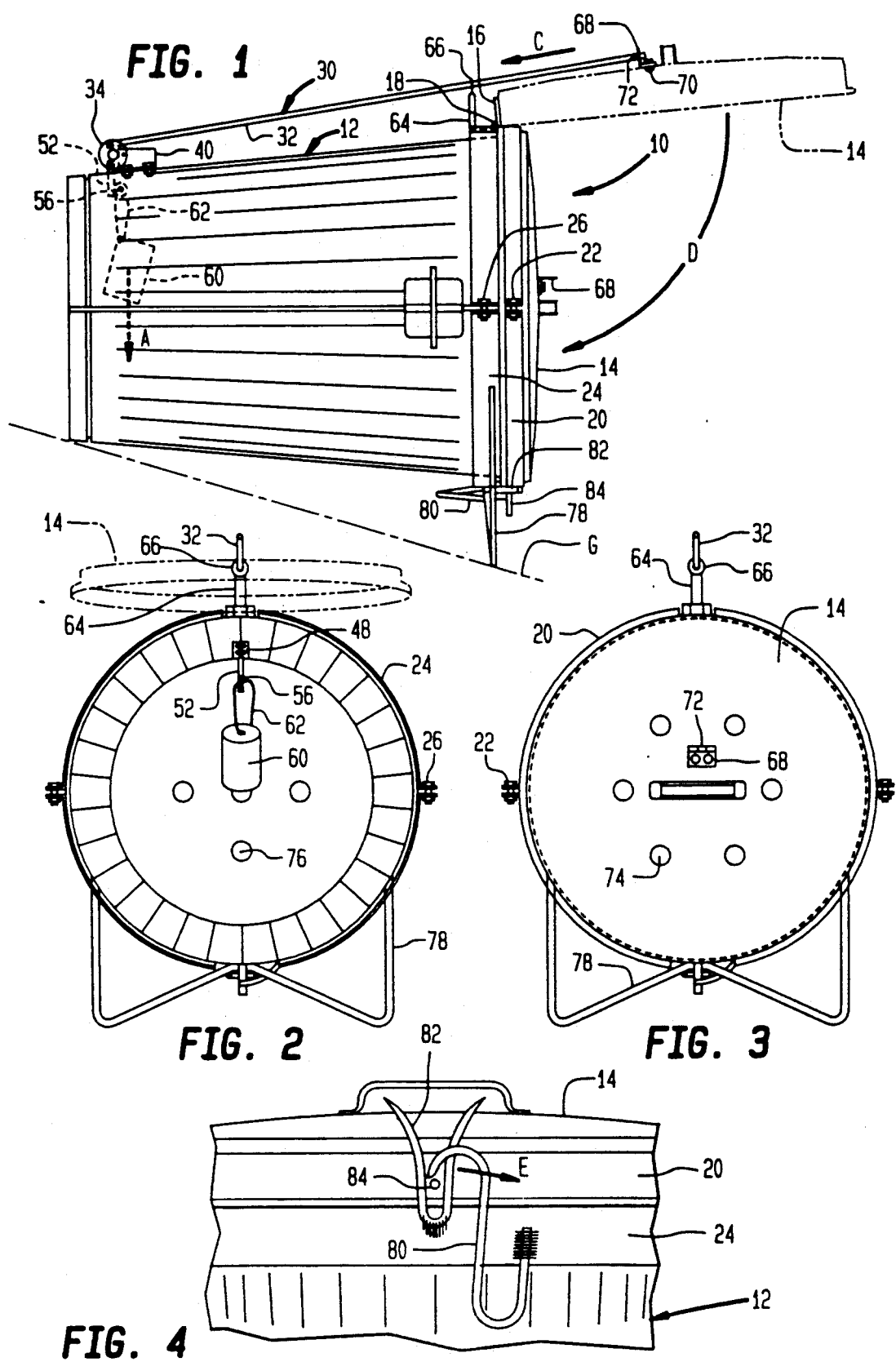

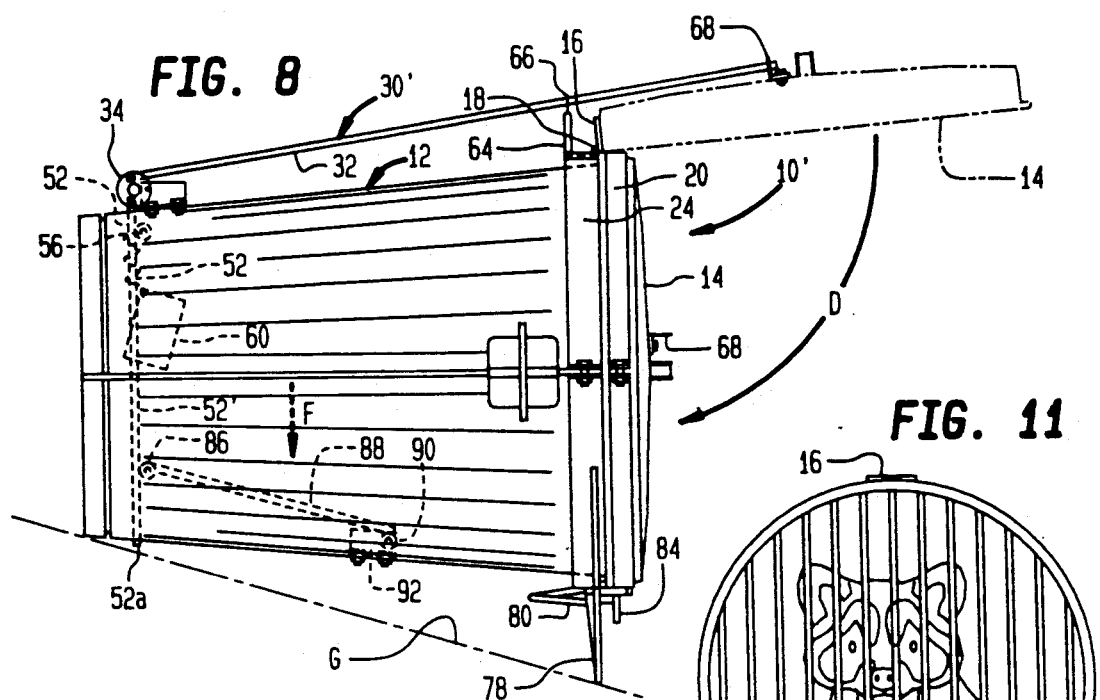
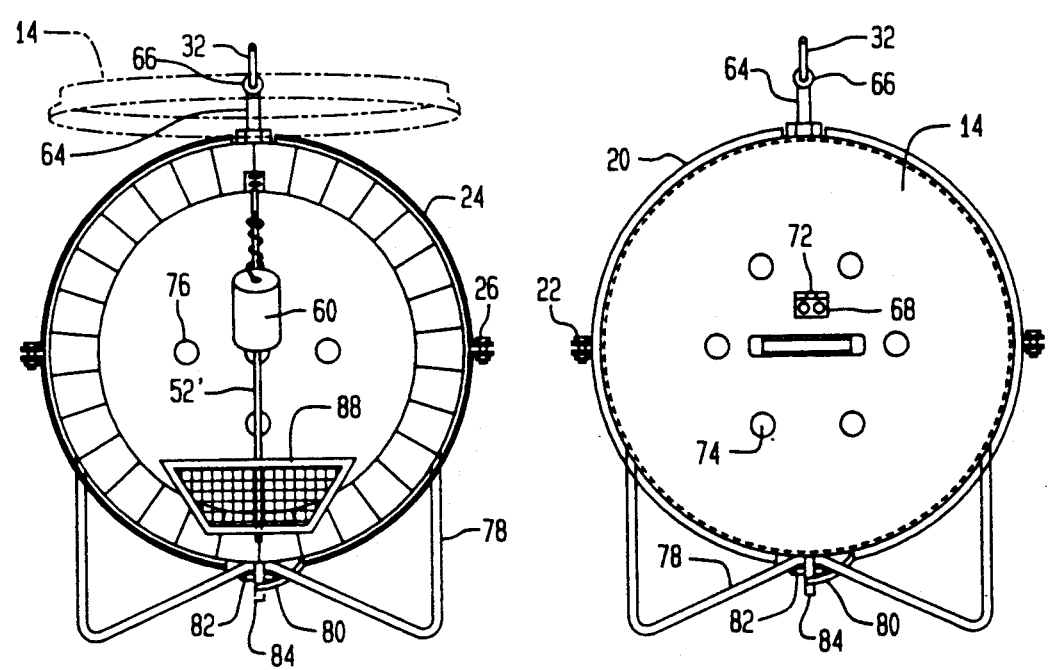

ANIMAL TRAP

BACKGROUND OF THE INVENTION

This invention relates generally to animal traps and more particularly to an animal trap constructed utilizing a conventional trash container for trapping animals unharmed.

The utilization of animal traps, particularly in residential areas, to capture annoying wild animals is well known. The desirability of this removal is prompted because many of these animals such as raccoons, possum, stray cats or the like will upset and scatter the contents of trash containers and otherwise generally annoy residents.

Because of our generally humane nature, most people would rather harmlessly trap such wildlife for relocation away from home sites. Commercially available traps for accomplishing this tend to be rather expensive, thus tending to discourage most individuals from their purchase for such relatively limited, infrequent use. Of course, a professional animal trapper may be contacted to service the area, in most cases at an even greater ongoing expense.

Applicant is aware of a number of patented animal traps, all of which fall into the rather expensive category of construction and purchase. In most cases, the cost of manufacturing the container itself represents a subsequent cost factor. One such device is disclosed in U.S. Pat. No. 2,573,228 invented by Slauth which discloses an elongated cylindrical container having a spring biased closable and lockable lid which is triggered by an animal contacting against an upright contact plate near the closed end of the container. A similar device is disclosed in U.S. Pat. No. 3,426,470 to Rudolph which teaches a different triggering and closure mechanism.

Van Kuren, in U.S. Pat. No. 3,113,395 teaches an animal trap which claims to teach a more sensitive triggering mechanism structured utilizing flexible cord connected to a hanging bait positioned at the closed end of the trap.

Hunter, in U.S. Pat. No. 4,682,440 discloses an animal trap having a pivotally closable cage door and an automatic pivotal handle for latching same, the door being held open by a flexible cord connected to a paddle shaped bait tray.

The patents to Branson, U.S. Pat. No. 3,975,857, to Volk, U.S. Pat. No. 4,590,704 and to Lutes, U.S. Pat. No. 5,005,312 all disclose traps for rodents and mice or the like, all of which leave the rodent initially unharmed.

The present invention discloses an animal trap which will capture an animal such as a raccoon, cat, possum or the like which utilizes a conventional trash container to reduce the overall manufacture and purchase cost. The device also includes a unique bell crank arrangement to more efficiently transfer the animal's presence within the container for triggering the closing of the pivotally connected lid which falls by gravity into its closed position. The device may be provided with a bait container which activates closure of the lid when the animal reaches for the bait contained therewithin and/or may be provided with a pivotal floor trigger panel which will trigger closure when the animal steps into the container and onto the panel.

BRIEF SUMMARY OF THE INVENTION

This invention is directed to an animal trap and method of constructing same utilizing a conventional trash container having a bottom, side wall and an open end and removable lid therefor. The device includes a first and second annular band or ring each clampably connectable around the lid and container adjacent its opening, respectively, as well as a triggering rod and trip rod arrangement operably joined at a bell crank arrangement. A ground support arrangement connected to the second band supports the container in a generally horizontal position so that a hinge connected between first and second bands pivotally connects container opening and lid, the hinge being positioned directly above the ground support and at a highest common point of the bands. The triggering rod extends generally outside and along the length of the container, being held for axial movement only between the bell crank positioned near the bottom and an apertured bracket connected to a mid point of the lid. The lid is held in an open position by the triggering rod until urged axially by an animal within the container pulling on a bait container hung from the upright trip rod which extends downwardly from the bell crank through a hole formed in the side wall into the container. A separate floor trigger panel operably connected to the trip rod may also be provided which releases the lid to fall to its closed position as an animal enters the container and steps on the panel.

It is therefore an object of this invention to provide an animal trap for harmlessly trapping animals unharmed utilizing a conventional trash container in a horizontal orientation.

It is yet another object of this invention to provide an economical animal trap kit and a method of constructing the animal trap in conjunction with an existing conventional trash container.

It is yet another object of this invention to provide an animal trap which is triggered closed by either an animal grasping for a filled bait container and/or downwardly depressing a floor panel by stepping thereupon after entering the container.

In accordance with these and other objects which will become apparent hereinafter, the instant invention will now be described with reference to the accompanying drawings.

BRIEF DESCRIPTION OF THE DRAWINGS

FIG. 1 is a side elevation view of the preferred embodiment of the invention.

FIG. 2 is a right end elevation view of FIG. 1 with the lid in its open position shown in phantom.

FIG. 3 is a view similar to FIG. 2 with the lid in its closed position.

FIG. 4 is an enlarged partial bottom plan view of the locking arrangement of FIG. 1.

FIG. 8 is a side elevation view of an alternate embodiment of the invention.

FIG. 9 is a right end elevation view of FIG. 8 showing the lid in its open position in phantom.

FIG. 10 is a view similar to FIG. 9 showing the lid in its closed position.

FIG. 11 is an alternate form of the closable lid.

DETAILED DESCRIPTION OF THE INVENTION

Figure 7:
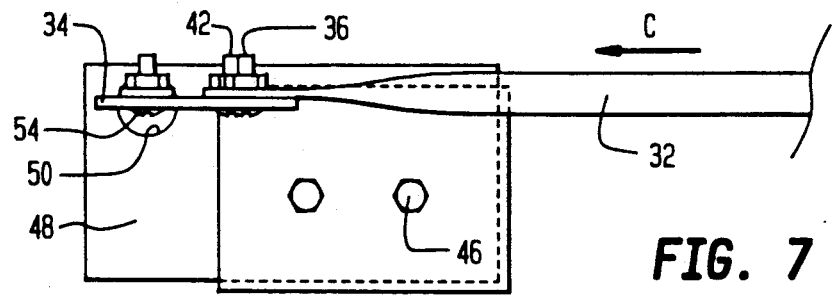
FIG. 7 is a top plan view of FIG. 6.

Referring now to the drawings, and particularly to FIGS. 1 to 7, the preferred embodiment of the invention is shown generally at numeral 10 and includes a conventional galvanized metal trash container (e.g. 20–50 gal. capacity) shown generally at numeral 10 which is typically supplied with a separate handled metal lid 14 which closably seals onto the opening of the container 12. A first rigid metal annular two-part band 20 is clampably engagable by fasteners 22 around the perimeter of lid 14. A second annular two-part band 24 is similarly clamped by threaded fasteners 26 around the perimeter of container 12 at its open end as shown. These two bands 20 and 24 are hingedly connected by hinge 16 about its pivotal axis 18 which is positioned horizontally, generally transverse to the longitudinal axis of container 12 and generally tangent to the opening of the container 12.

The second band 24 also includes a wire support arrangement 78 as best seen in FIGS. 2 and 3 which provides paced legs to support the device 10 atop the ground G in conjunction with the support of the bottom at the opposite end of the container 12 as shown in FIG. 1. This container support 78 is structured so as to also prevent rolling of the device 10 as when an animal enters into the container 12.

Figure 6:
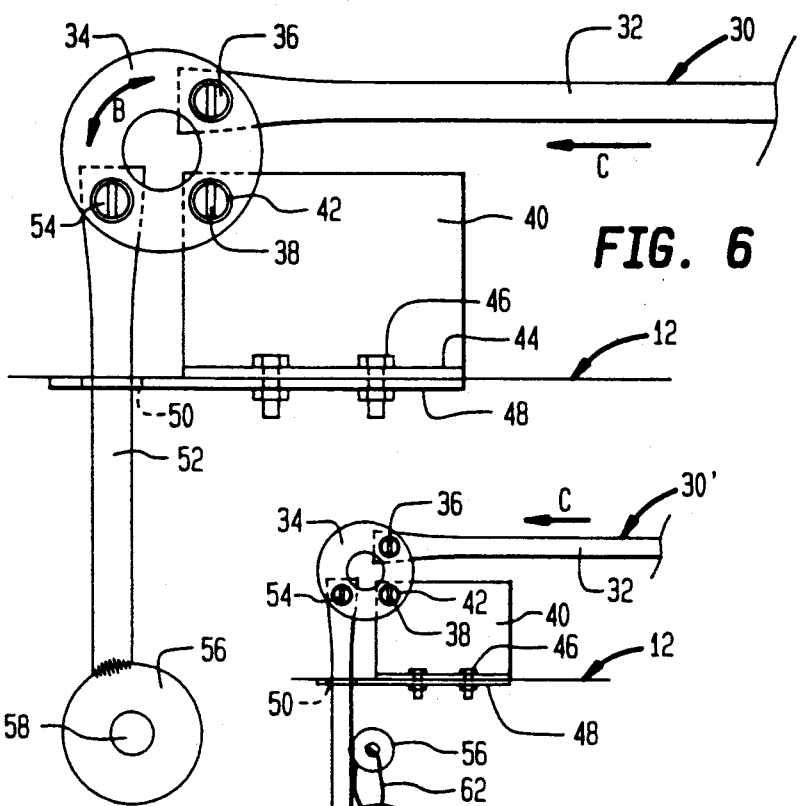
FIG. 6 is an enlarged view of the bell crank portion of FIG. 5.

A slender, rigid triggering rod 32 is part of the triggering arrangement shown generally at numeral 30. This triggering rod 32 is slidably mounted for translation back and forth in the direction of arrow C, being operably connected at one end to a bell crank 34 and slidably supported within guide 66 on bracket 64 which is rigidly connected to the second band 24. Bell crank 34 is rotationally connected to mounting block 40 about fastener 42 so as to rotate back and forth in the direction of arrow B in FIG. 6. Mounting block 40, in turn, is connectable by plates 44 and 48 with fasteners 46 onto container 12 as best seen in FIG. 6. Both the bell crank 34 and the guide 66 are positioned at the uppermost corresponding points of the container 12 and band 24, opposite the container support 78. This then positions triggering rod 32 along and spaced above the uppermost region of container 12.

Triggering rod 32 extends beyond the opening of container 12 so as to be engagable through an aperture 72 in a bracket 68 boltably connected to a mid-region of lid 14 as shown in FIG. 1. By this arrangement, when the triggering rod is engaged into aperture 72, the lid 14 is held open. When the triggering rod 32 is moved in the direction of arrow C in FIG. 1, disengagement from apertured bracket 68 occurs, allowing the lid 14 to drop by gravity in the direction of arrow D to its closed position.

Figure 5:
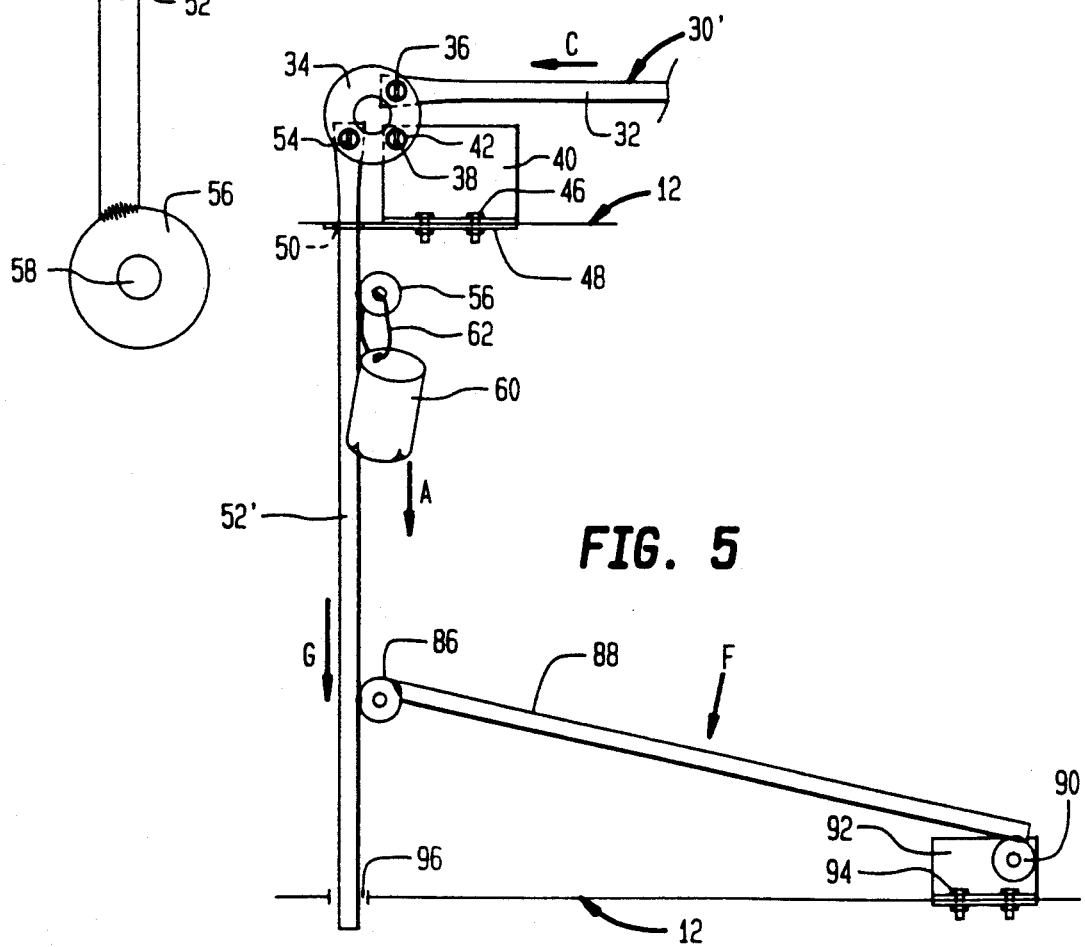
FIG. 5 is a side elevation schematic view of the lid closure triggering arrangement mechanism depicting both a bait holder and a pivotal floor trigger panel for triggering the device.

To accomplish the movement of triggering rod 32, as best seen in FIGS. 5 to 7, an elongated trip rod 52 connected at its upper end by bolt 54 to bell crank 34 is provided. This trip rod 52 extends or hangs downwardly through aperture 50 and a corresponding aperture formed through the side wall of container 12 to a bait hanger 56 having a central aperture 58 therethrough. A string or wire 62 interconnects the bait hanger 56 with a bait holder 60 having apertures formed at its lower end so as to increase the dispersion of the scent of bait placed therein. By this arrangement, when an animal grasps at the bait holder 60, downward movement in the direction of arrow A results.

As best seen in FIG. 1, the positioning of the bait holder 60 is generally central with respect to the bottom and interior cross section of the container 12. Importantly, the bell crank 34 and downwardly hanging bait holder 60 are positioned almost immediately adjacent and quite near to the bottom of container 12 so that the animal will be fully within the container 12 before the lid 14 is triggered to its closed position.

Once the animal has entered into the container 12 and triggered the closure arrangement, resulting in the closing of lid 14, a latch mechanism is also provided as best seen in FIGS. 1 and 4. A wire peg 84 is connected to and radially extending from the first band 20. A taper wire guide 82 is rigidly connected to second band 24 as shown so as to compensate for any misalignment of peg 84 as it falls into guide 82. A wire latch 80, connected at one end to second band 24 as shown, then resiliently flexes in the direction of arrow E when struck by peg 84, thereafter to return to its free configuration so as to entrap peg 84 within guide 82.

Referring now to FIGS. 8, 9, and 10, an alternate embodiment of the invention is there shown at numeral 10' and includes a conventional metal trash container 12 and lid 14 as previously described. The triggering mechanism shown generally at numeral 30' is in all respects similar to that previously described, except for the addition of a wire mesh floor trigger panel 88 which is pivotally connected at 90 through mounting bracket 92 to the inner surface of container 12. The opposite end of this floor panel 88 is connected at 56 to the extension 52' of trip rod 52 previously described. Thus, when an animal enters into the container 12 and steps onto the floor panel 88, exerting a downwardly force F thereupon, the triggering rod 32 then disengages from apertured bracket 68 to allow the lid 14 to fall downwardly in the direction of arrow D to its closed position.

Importantly, note that the size and positioning of the floor panel 88 is such that the animal must fully enter into the container 12 before being able to step upon the floor panel 88 to reach the contents of bait holder 60. This structural feature is important so as to insure that the animal is fully within the container before the triggering mechanism is activated to close lid 14.

To facilitate keeping the animal alive while trapped within the container, breathing holes 74 and 76 are provided in the bottom and lid, respectively. To facilitate viewing the trapped prey, a grill or bar configured lid 100 is shown in FIG. 11. A plurality of spaced upright bars 102 are rigidly connected across an annular frame 106, which is also connected to hinge 16 at its upper most point and locking peg 104 at its lower most point as previously described.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An animal trap constructed using a conventional trash container having a bottom and a side wall extending from said bottom to define an open end generally parallel to and spaced from said bottom, said container including a lid which closably engages over said opening, comprising:
- a hinge pivotally connecting a common point of said lid and said open end;
- support leg means for supporting said container in a generally horizontal position atop the ground with said hinge positioned at a highest point of said open end;
- a bell crank mounted for rotation about an axis on said side wall outer surface adjacent said bottom;
- an elongated slender rigid triggering rod mounted for sliding translation only generally in longitudinal alignment with said container and adjacent an outer surface of said side wall, said triggering rod operably connected at a first end thereof to said bell crank;
- a second end of said triggering rod extending beyond said open end to supportively engage into an apertured bracket connected to a central outer point of said lid, said triggering rod generally in alignment above said hinge whereby said lid is supported in an open position by said triggering rod second end when engaged into said apertured bracket and said container is disposed atop the ground on said support leg means;
- an elongated slender rigid trip rod operably connected at one end to said bell crank and slidably mounted and downwardly extending from said bell crank through an aperture formed in said side wall adjacent said bottom providing axial up and down translation only of said trip rod;
- a bait holder hangingly connectable to said trip rod, said bait holder positioned within said container adjacent said bottom whereby said triggering rod is moved axially out of engagement with said apertured bracket allowing said lid to fall to a closed position by gravity when an animal within said container pulls downward on said bait holder.

2. An animal trap as set forth in claim 1, further comprising:
- latch means for automatically releasably locking said lid after falling to its closed position.

3. An animal trap as set forth in claim 2, further comprising:
- a floor trigger panel positioned within said container in close proximity above a lower portion of said side wall and pivotally connected at a first end thereof to said side wall, a second end of said trigger panel pivotally connected adjacent said bottom to a lower portion of said trip rod below said bait holder whereby said triggering rod is moved axially out of engagement with said apertured bracket allowing said lid to fall to its closed position by gravity when an animal moves into aid container and contacts said trigger panel;
- said first end positioned from said open end a distance sufficient for a small animal such as a raccoon to substantially enter said container entirely before contacting said trigger panel.

4. An animal trap as set forth in claim 3, wherein: said lid or said bottom or both include breathing holes.

5. An animal trap constructed using a conventional trash container having a bottom and a side wall extending from said bottom to define an open end generally parallel to and spaced from said bottom, said container including a lid which closably engages over said opening, comprising:
- a first annular band clampably connectable around a perimeter of said lid;
- a second annular band clampably connectable around a transverse circumference of said container immediately adjacent said open end;
- a hinge pivotally connecting a common point of said first and second bands;
- support leg means connected to a lower region of said second band for supporting said container in a generally horizontal position atop the ground with said hinge positioned at a highest point of said open end;
- a bell crank mounted for rotation about an axis on said side wall outer surface adjacent said bottom;
- an elongated slender rigid triggering rod mounted for sliding translation only generally in longitudinal alignment with said container and adjacent an outer surface of said side wall, said triggering rod operably connected at a first end thereof to said bell crank;
- a support guide connected to said second band adjacent said hinge for slidably receiving and supporting said triggering rod therethrough;
- a second end of said triggering rod extending beyond said open end to supportively engage through said support guide and into an apertured bracket connected to a central outer point of said lid, said triggering rod generally in alignment above said hinge whereby said lid is supported in an open position by said triggering rod second end when engaged into said apertured bracket and said container is disposed atop the ground on said support leg means;
- an elongated slender rigid trip rod operably connected at one end to said bell crank and slidably mounted and downwardly extending from said bell crank through an aperture formed in said side wall adjacent said bottom providing axial up and down translation only of said trip rod;
- a bait holder hangingly connectable to said trip rod, said bait holder positioned within said container adjacent said bottom whereby said triggering rod is moved axially out of engagement with said apertured bracket allowing said lid to fall to a closed position by gravity when an animal within said container pulls downward on said bait holder.

6. An animal trap as set forth in claim 5, further comprising:
- latch means for automatically releasably locking said lid after falling to its closed position.

7. An animal trap as set forth in claim 6, further comprising:
- a floor trigger panel positioned within said container in close proximity above a lower portion of said side wall and pivotally connected at a first end thereof to said side wall, a second end of said trigger panel pivotally connected adjacent said bottom to a lower portion of said trip rod below said bait holder whereby said triggering rod is moved axially out of engagement with said apertured bracket allowing said lid to fall to its closed position when an animal moves into said container and contacts said trigger panel;
- said first end positioned from said open end a distance sufficient for a small animal such as a raccoon to substantially entirely enter said container before contacting said trigger panel.

8. An animal trap as set forth in claim 7, wherein:

said lid or said bottom or both include breathing holes.

9. A method of constructing an animal trap using a conventional trash container having a bottom and a side wall extending from said bottom to define an open end generally parallel to and spaced from said bottom, said container including a separate lid which closably engages over said opening, comprising the steps of:
- A. clampably connecting a first annular band around a perimeter of said lid;
- B. clampably connecting a second annular band around a transverse perimeter of said container immediately adjacent said open end;
  - said second band including support leg means connected to a lower region of said second band for supporting said container in a generally horizontal position atop the ground with said hinge positioned at a highest point of said open end;
  - said first and second bands being pivotally connected to one another by a hinge about a common generally tangent axis therebetween, said common axis being transverse to said container;
  - said second band also having a support guide rigidly connected thereto adjacent said second band;
- C. mounting a bell crank for rotation about an axis transverse to said container on said side wall outer surface adjacent said bottom;
- D. connecting an apertured bracket to a central outer point of said lid;
- E. positioning an elongated slender rigid triggering rod for sliding translation only generally in longitudinal alignment with said container and adjacent an outer surface of said side wall, a portion of said triggering rod passing through and being supported by said support guide a first end of said triggering rod being operably connected to said bell crank;
  - a second end of said triggering rod extending beyond said open end to engage into an apertured bracket connected to a central outer point of said lid, said triggering rod generally in alignment above said hinge whereby said lid is supported in an open position by said triggering rod second end when engaged into said apertured bracket and said container is disposed atop the ground on said support leg means.
- F. positioning an elongated slender rigid trip rod and operably connecting an upper end thereof to said bell crank and slidably mounting and downwardly extending said triggering rod from said bell crank through an aperture formed in said side wall adjacent said bottom providing axial up and down translation only of said trip rod;
- G. connecting a bait holder to said trip rod, said bait holder positioned within said container adjacent said bottom whereby said triggering rod is moved axially out of engagement with said apertured bracket allowing said lid to fall to a closed position by gravity when an animal within said container pulls downward on said bait holder.

10. A method as set forth in claim 9, further comprising the steps of:
- H. forming breathing holes in said lid or said bottom or both.

11. A method as set forth in claim 9, further comprising the steps after step F of:
- I. connecting a floor trigger panel within said container in close proximity above a lower portion of said side wall and pivotally connecting a first end thereof to said side wall, a second end of said trigger panel being pivotally connected adjacent said bottom to a lower portion of said trip rod below said bait holder whereby said triggering rod is moved axially out of engagement with said apertured bracket allowing said lid to fall to its closed position when an animal moves into aid container and contacts said trigger panel;
  - said first end positioned from said open end a distance sufficient for a small animal such as a raccoon to substantially enter said container entirely before contacting said trigger panel.

* * * * *